United States Patent
James et al.

(10) Patent No.: US 7,219,762 B2
(45) Date of Patent: May 22, 2007

(54) METHOD AND APPARATUS FOR ACOUSTIC DETECTION OF A FLUID LEAK BEHIND A CASING OF A BOREHOLE

(75) Inventors: Simon James, Clamart Cedex (FR); Peter Fitzgerald, Clamart Cedex (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/559,090

(22) PCT Filed: May 12, 2004

(86) PCT No.: PCT/EP2004/005079

§ 371 (c)(1),
(2), (4) Date: Nov. 29, 2005

(87) PCT Pub. No.: WO2004/111388

PCT Pub. Date: Dec. 23, 2004

(65) Prior Publication Data

US 2006/0133203 A1    Jun. 22, 2006

(30) Foreign Application Priority Data

Jun. 6, 2003  (EP) ................................. 03291350

(51) Int. Cl.
*G01V 1/00* (2006.01)
(52) U.S. Cl. ......................................... 181/105; 367/35
(58) Field of Classification Search .............. 181/102, 181/105; 367/30, 35; 73/152.18
See application file for complete search history.

(56) References Cited

U.S. PATENT DOCUMENTS

| 3,588,800 | A | * | 6/1971 | Moore et al. ................. 367/14 |
| 4,046,220 | A | * | 9/1977 | Glenn, Jr. ................... 181/105 |
| 4,114,721 | A | | 9/1978 | Glenn |
| 4,319,346 | A | | 3/1982 | MacDonald |
| 4,646,273 | A | | 2/1987 | Carlson et al. |
| 4,928,269 | A | | 5/1990 | Kimball et al. |
| 5,010,527 | A | | 4/1991 | Mahrer |

FOREIGN PATENT DOCUMENTS

EP  0 395 499  10/1990

OTHER PUBLICATIONS

HB Koerner, JC Carroll "Use of the noise log as downhole diagnostic tool".
Society of Petroleum Engineers, vol. SPE No. 7774 Mar. 25, 1979-Mar. 29, 1979 pp. 191-198, XP002257831.

* cited by examiner

*Primary Examiner*—Mark Hellner
(74) *Attorney, Agent, or Firm*—Kevin P. McEnaney

(57) ABSTRACT

An acoustic detection of a discrete acoustic signal allows to detect a leak behind a casing (23) of a borehole. An acoustic amplitude (AA) is sampled during a recording time period (24; 64) at a determined position along the tube. Time intervals (26; 66) are defined inside of the recording time period (24), and for each time interval (26) the measured acoustic amplitudes are processed to obtain respectively a corresponding power-frequency spectrum (261). A plurality of the power-frequency spectra are analyzed to identify the discrete acoustic signal by detecting time and frequency dependant changes of power. Preferably the processing involves a Fourier transform analysis. A power-frequency time plot is used to conveniently identify the discrete acoustic event.

12 Claims, 8 Drawing Sheets

METHOD AND APPARATUS FOR ACOUSTIC DETECTION OF A FLUID LEAK BEHIND A CASING OF A BOREHOLE

TECHNICAL FIELD

The invention relates to the field of acoustic investigation techniques used in wells.

BACKGROUND OF THE INVENTION

Acoustic investigation techniques are widely used as non-destructive tools to check the integrity of wells and their casing. As an example, noise logging has been used for almost 30 years to detect the location of gas leaks behind a casing of a well.

Gas leaks behind casing generally occur when a gas-bearing zone has not been properly isolated during the well construction process. The lack of zonal isolation allows gas to flow from the gas-bearing zone to the surface or to another subterranean zone outside the casing. The gas leak may for example cause an uncontrolled accumulation of gas behind the casing or at the surface of the well, and lead to a hazardous situations such as the contamination of a water table surrounding the well or the creation of an explosive mixture of gas at the surface.

Turning now to FIG. 1, a schematic diagram illustrating a general principle of the logging operation in a well is shown. A tool or sonde 10, for acquiring noise data is located in a borehole 11 penetrating an earth formation 12. The borehole 11 is lined by a casing 13. The sonde 10 is lowered in the borehole 11 by a cable 14 and slowly raised by a surface equipment 15 over a sheave wheel 16 while noise data is recorded. A depth of the sonde 10 is measured using a depth gauge 17 which measures cable displacement. Noise data acquired by the sonde 10 may be analysed either in situ near the sonde 10, or analysed by a data processor 18 at the surface, or stored, for later analysis.

Reliable detection of the position of a leak in the borehole is critical in designing a repair job for that leak and for subsequent determination of the success of leak repair.

Many techniques have been used to detect a position of a fluid leak in a borehole or in other environments. These techniques have been applied either individually or in combination with each other as will be understood from the prior art documents described hereafter.

One form of noise logging tool was proposed in the 1970's and is described in more detail in the following references:

McKinley, R. M., Bower, F. M., and Rumble, R. C.: "The Structure and Interpretation of Noise From Flow Behind Cemented Casing," SPE3999, JPT, March 1973, P329, Robinson, W. S.: "Field Results From the Noise-Logging Technique," SPE5088, JPT, November 1976, P1370, McKinley, and R. M., Bower, F. M.: "Specialized Applications of Noise Logging," SPE6784, JPT, March 1979, P1387, Brift, E. L.: "Theory and Applications of the Borehole Audio Tracer Survey," SPE6552, Transactions of the SPWLA Seventeenth Annual Logging Symposium, Jun. 9-12, 1976, Denver, Colo., Koerner, Jr., H. B., and Carroll, J. C.: "Use of the Noise Log as a Downhole Diagnostic Tool," SPE7774, presented at the SPE Middle East Oil Technical Conference, Bahrain, 25-29 Mar. 1979.

The tool generally contains 4-6 high pass filters that transmit noise amplitudes above 200, 600, 1000, 2000, 4000 and 6000 Hz. For tools with the lowest number of filters, the 4000 and 6000 Hz cutoffs are eliminated. The noise data provided at surface is an average of these measured transmitted noise amplitudes over a certain time period, 10 seconds for example. The coarse frequency resolution and the time averaging limit the application of this type of tool to relatively high leak rates where the noise generated is semi-continuous and significant compared to background noise.

SUMMARY OF THE INVENTION

In a first aspect the invention provides a method for acoustic detection of a leak behind a casing of a borehole. The leak generates a discrete acoustic signal. The method comprises sampling an acoustic amplitude during a recording time period at a determined position along the borehole, and defining time intervals inside of the recording time period. For each time Interval the measured acoustic amplitudes are processed to obtain respectively a corresponding power-frequency spectrum. A plurality of the power-frequency spectra are analysed to identify the discrete acoustic signal by detecting time and frequency dependant changes of power.

In a first preferred embodiment the processing is performed using a Fourier transform analysis.

In a second preferred embodiment the time intervals are of same duration and subsequent time intervals are adjacent to each other in order to cover a continuous portion of the recording time period.

In a third preferred embodiment the method comprises plotting the power-frequency spectra in a power-frequency-time plot graph, and identifying a surface of the power-frequency-time plot graph wherein a value of power corresponds to a predetermined value. The identified surface is analysed to detect the discrete acoustic signal.

In a fourth preferred embodiment a duration of the recording time period is adapted to measure at least one discrete acoustic signal.

In a fifth preferred embodiment the sampling is performed at one or a plurality of further determined positions along the borehole in order to investigate a section of the borehole covered by the determined and further determined positions.

In a sixth preferred embodiment the power-frequency-time plots resulting from the measured acoustic amplitudes are aligned into an extended graph in an order corresponding to successive positions of the borehole, the extended graph showing frequency and time dependant power values as occurring along the borehole.

In a seventh preferred embodiment the sampling is done at an acquisition rate between 30 kHz and 50 kHz.

In a second aspect the invention provides a method for detection of a leak behind a casing of a borehole. A portion of the borehole is investigated using a first investigation method to obtain a first result of investigation. The portion of the borehole is also investigated using a method for acoustic detection of a leak behind a casing to obtain a second result of investigation. The first and the second results of investigation are compared to identify a correlation between the first and the second results.

In a third aspect the invention provides a method for repairing a leak wherein the leak is detected using a method for acoustic detection of a leak behind a casing of the borehole, and a repair process activated for repairing the leak.

In an eighth preferred embodiment the repair process comprises perforating the casing to obtain an opening, and squeezing a repair fluid in the opening.

In a ninth preferred embodiment the repair process comprises milling out the casing around the leak and placing a plug of sealing fluid to cover at least an entire volume milled out from the casing.

BRIEF DESCRIPTION OF THE DRAWINGS

The invention will now be described in greater detail with reference to the accompanying drawings, in which.

DETAILED DESCRIPTION OF EXAMPLE EMBODIMENTS

Same references will be used to reference the same elements in the Figures throughout the description.

General Overview

Figure 1:
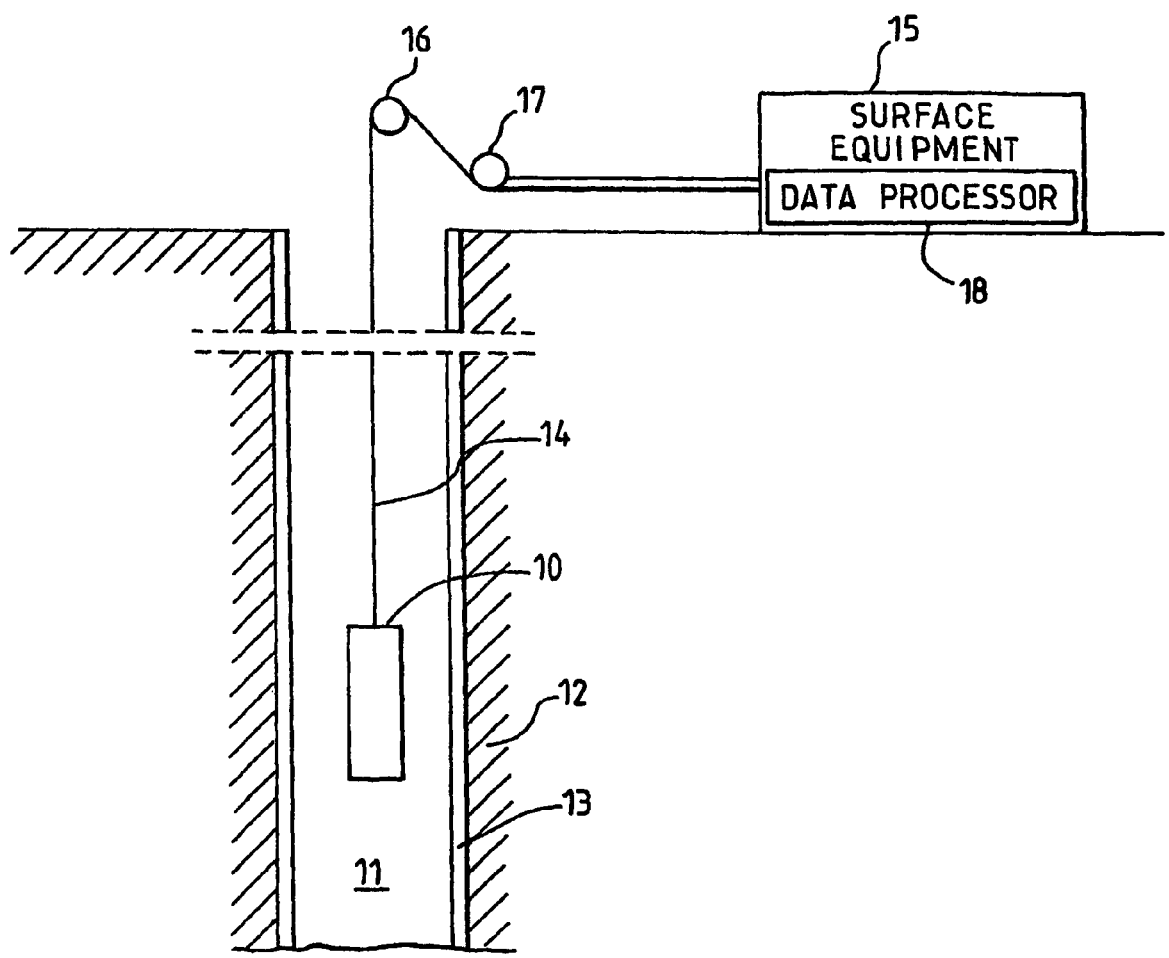
FIG. 1 illustrates a schematic diagram of a logging operation from prior art.
Figure 2:
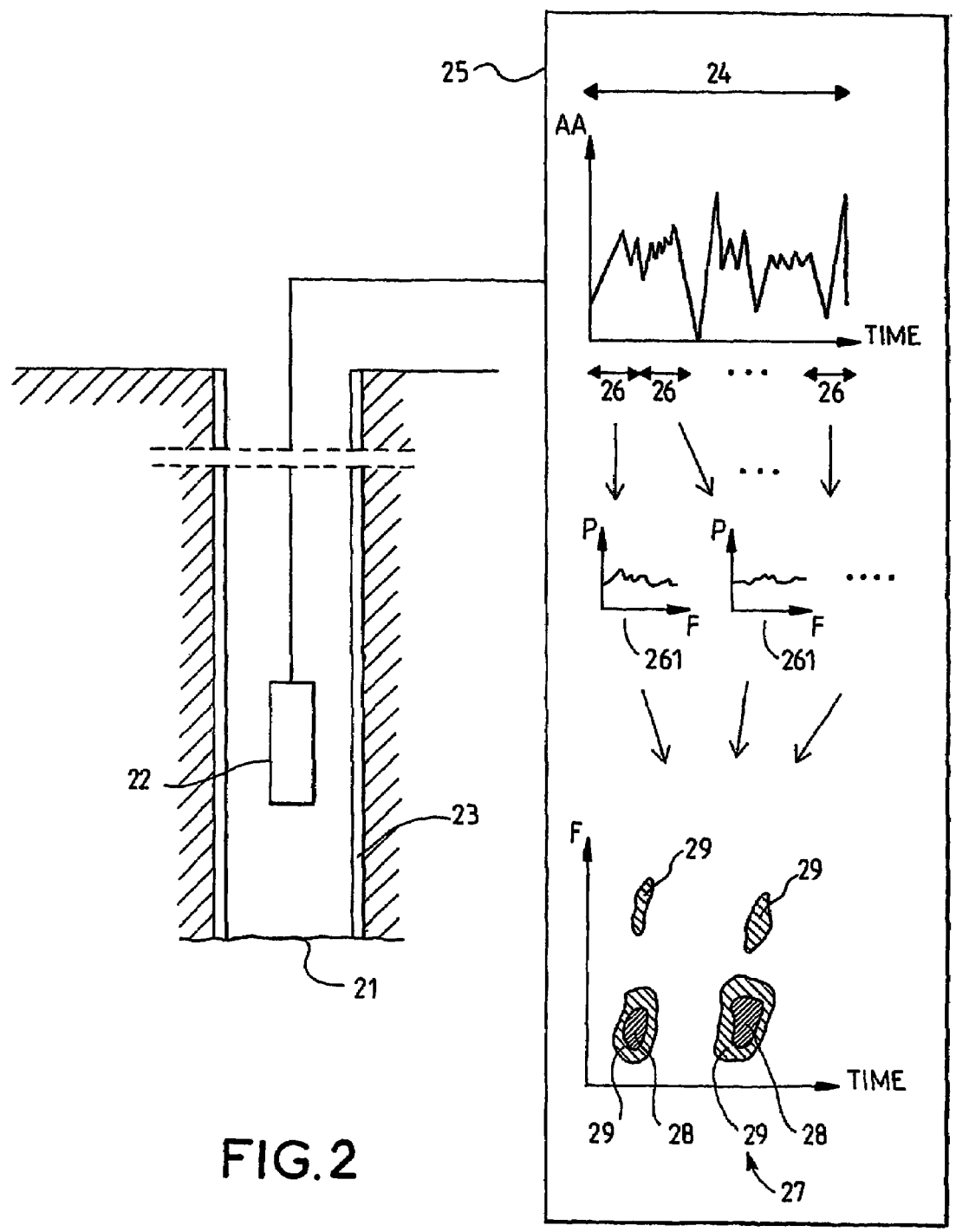
FIG. 2 illustrates a first example embodiment of measuring and processing acoustic amplitudes according to the invention.

FIG. 2 provides an illustration of one example embodiment of the present invention. In this embodiment, passive noise recording is performed at a given depth in a borehole 21. A suitable noise detector 22 (hydrophone or geophone for example) is used to record Acoustic Amplitude (AA) for a given period of recording time 24.

The acoustic amplitude is recorded during one or a plurality of periods of recording time that generally have a duration adapted to be able to capture at least one acoustic event generated by a leak. The duration of the period of recording time 24 may for example have a value in a range from 10 to 30 seconds. The value may be decreased to 5 seconds or less for acoustic events that occur several times per second, and increased to several minutes for acoustic events that occur two or three times per minute. It is important that the recording time is sufficient to allow a representative portion of noise to be recorded.

Recorded information is sent to a surface system 25 for acquisition and analysis. In other examples of embodiments, the recorded information may be processed and analysed in situ near the noise detector, or stored for further analysis.

Time intervals 26 are defined inside of the period of recording time 24. The acoustic amplitude measurements of a time interval 26 are processed to obtain a power-frequency (p, f) spectrum 261 for this time interval 26. In this embodiment, Fourier transform analysis is performed over each time interval 26, thus providing a plurality of power-frequency spectra 261.

The acoustic amplitude is measured using a sampling method. The sampling method comprises acquiring measurements at a rate adapted to obtain a desired acoustic frequency range. As an example, the acquisition rate may be between 30 and 50 kHz in order to allow the full audible frequency range to be analysed.

An optimum number of measured samples and, consequently, a length of the time intervals 26 used for the Fourier transform analysis may be a function of the acquisition rate. The number of measured samples should be sufficient to obtain a suitable acoustic frequency resolution but not too great so as to avoid averaging data corresponding to the measured samples over a duration much longer than a possible duration of the acoustic event that would be generated by a leak.

A particularly useful acquisition rate is 44 kHz. This acquisition rate allows the entire audible frequency range (20-20000 Hz) to be covered. In this embodiment, Fourier transforms over 1024 or 2048 measurement samples correspond to a time resolution of approximately 25 ms or 50 ms respectively.

The power-frequency spectra 261 are analysed to detect time and frequency dependant changes of power.

In a preferred embodiment, the resulting data may be plotted in a power-frequency-time plot 27. The abscissa and the ordinate respectively are indicative of time and frequency f. A power density representative of a value of the frequency dependent power may for example be indicated in the plot 27 using colour. Any other method for characterizing a surface may be used instead as appropriate: various greyscales may be used to represent respective associated values of power density, for example a dark grey may represent a high value while a lighter grey would indicate a lower value. In a similar manner shading of surfaces, or filling with patterns etc . . . may be used to obtain a representation of different values as appropriate. Returning to the discussed example, a plurality of colours may indicate a plurality of power density values.

On the power-frequency-time plot 27 of FIG. 2, hatched surfaces 28 and 29 are used to represent 2 power density values instead of 2 colours, in view of the black and white nature of the plot.

Power-Frequency-Time Plot

Figure 3:
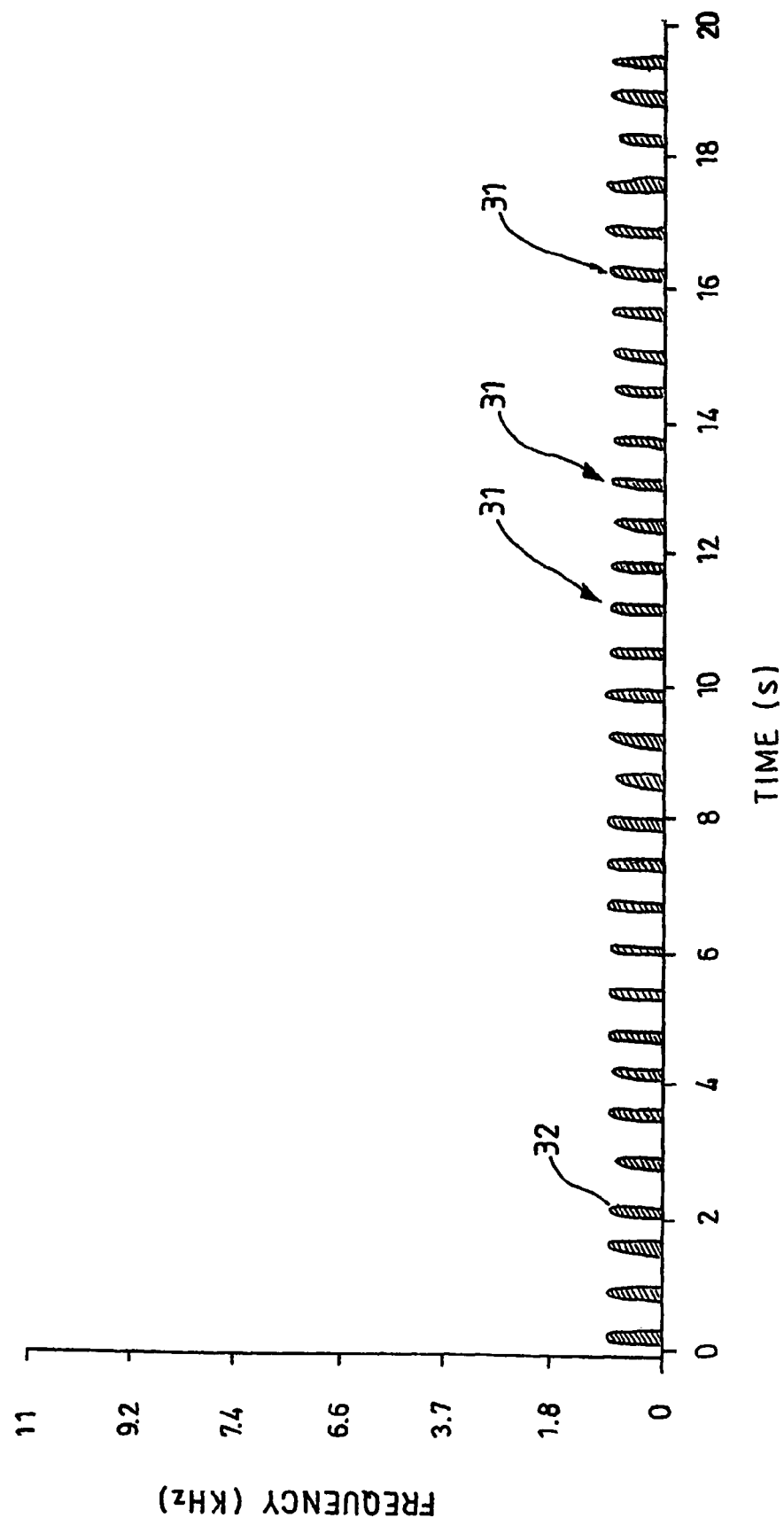
FIG. 3 illustrates an example of a power-time-frequency plot according to the invention.

An example of a power-frequency-time plot is shown in FIG. 3. Hatched surfaces represent power densities having a value exceeding a determined threshold value, similar as in the power-frequency-time plot 27 of FIG. 2.

The abscissa shows the time in seconds.

In this example the acoustic amplitude of the noise was recorded during a period of 20 seconds at an acquisition rate of 44 kHz. Fourier transform is performed for 1024 subsequent measured samples, i.e. for measurements recorded in a time interval of approximately 25 ms.

The ordinate indicates frequency in kHz, from 0 to 11 kHz.

The values of the power density may for example be in dB, normalized to an arbitrary value.

The example from FIG. 3 is obtained using an experimental set-up as follows: a gas is bubbled into a large container of water from an outlet sized approximately 12 mm in diameter. The bubbles produced are approximately 15 mm in diameter and generated at a rate of approximately 3 bubbles every 2 seconds. A suitable noise detector containing a piezoelectric noise transducer and electronics is placed into the water at a distance of approximately 20 cm from the bubbling gas outlet. Hatched surfaces 31 correspond to power density peaks of discrete acoustic events caused by the bubble formation.

Figure 4A:
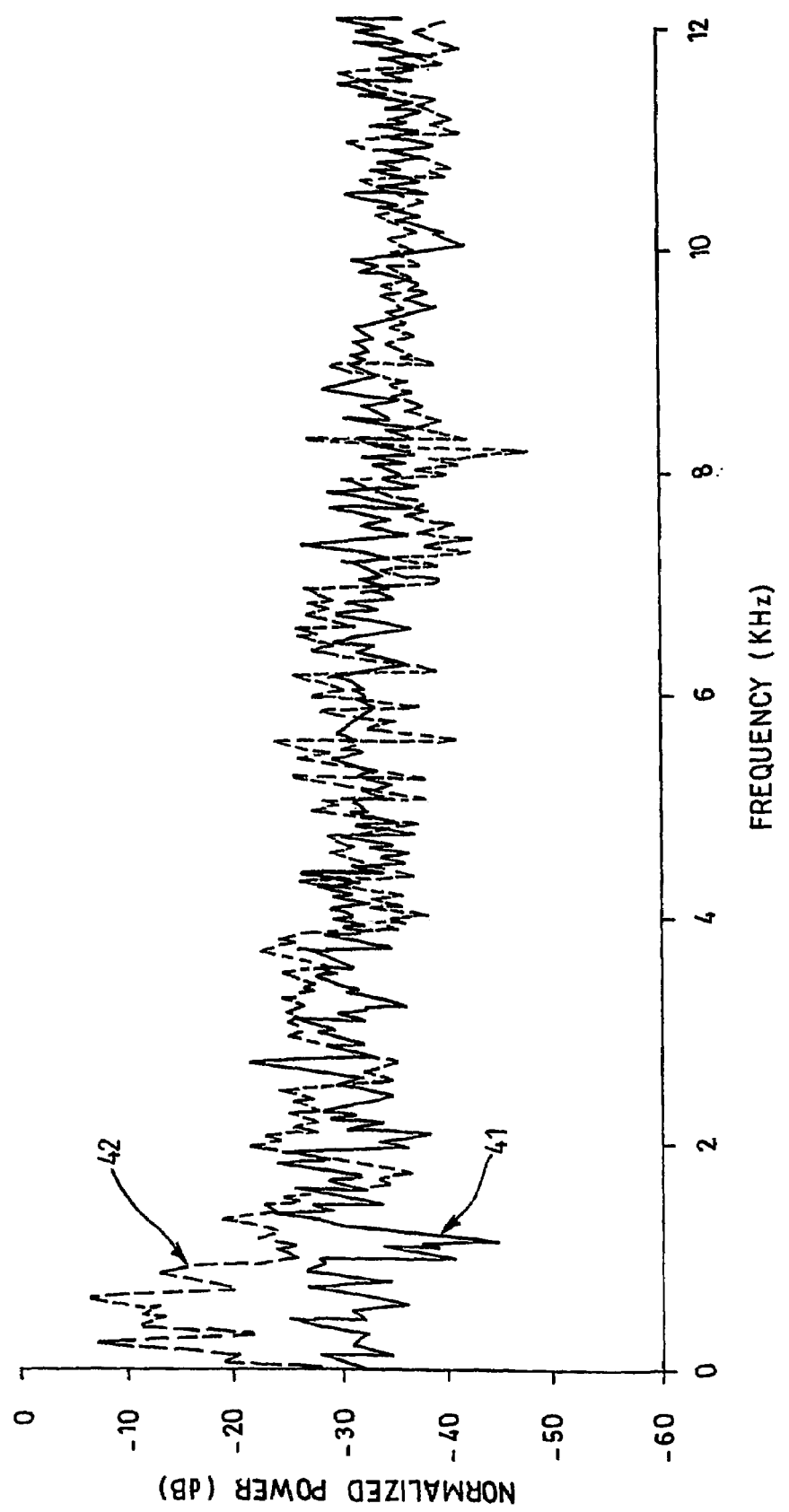
FIG. 4A illustrates two separate power-frequency spectra calculated at different times from acoustic amplitudes measured in a same period of recording time.

Effect of Analyzing Power-frequency Spectra for a Plurality of Subsequent Time Intervals FIG. 4A contains power-frequency spectra that Illustrate an advantage of performing Fourier transform analysis over measured samples corresponding to subsequent short time intervals in a continuous period of recording time.

A first power-frequency spectrum 41 (represented using a solid line) and a second power-frequency spectrum 42 (represented using a dotted line), distinct from the first spectrum 41, are generated using Fourier transform analysis on measured samples covering the acoustic event 32 shown in FIG. 3. The acoustic event 32 occurs approximately at a time t=2 s.

Figure 4B:
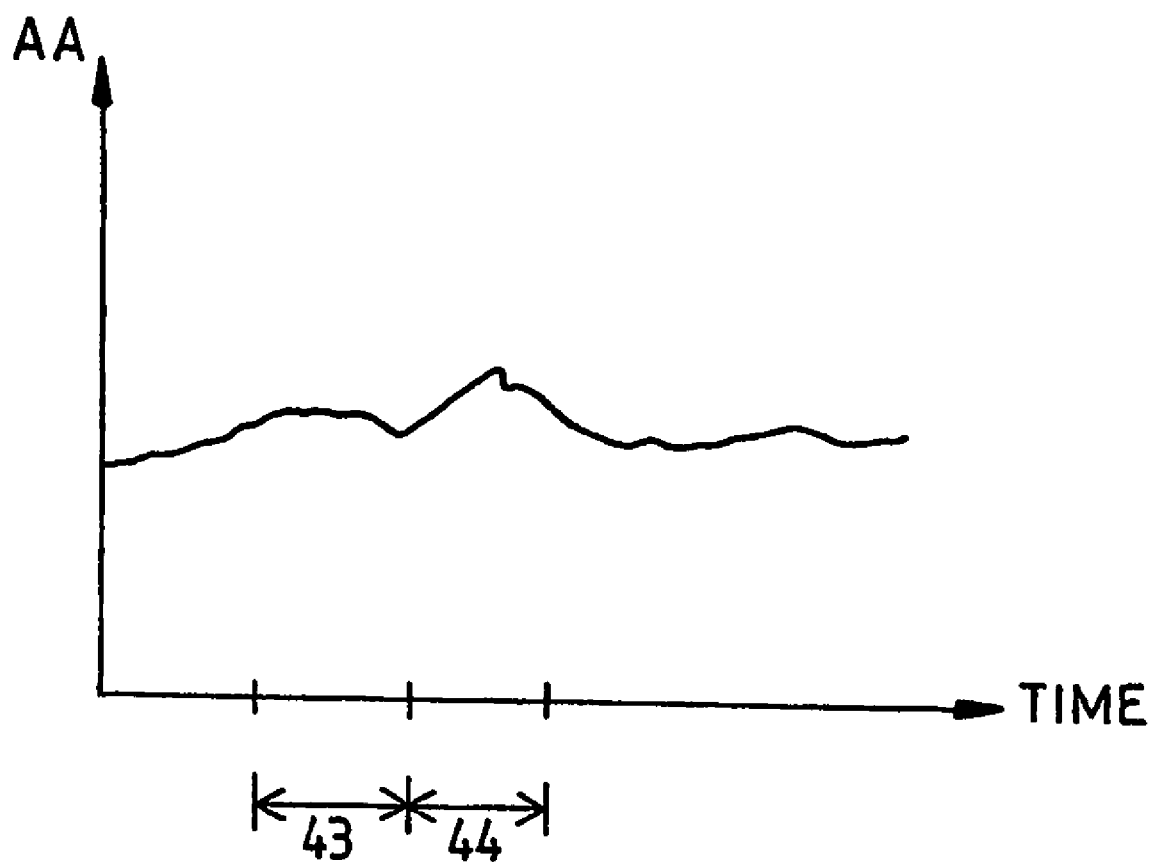
FIG. 4B contains an example of acoustic amplitude recordings from adjacent time intervals according to the invention.

Referring to FIG. 4B, Acoustic Amplitude measurements for the acoustic event 32 of FIG. 3 are schematically illustrated. It is understood that Acoustic Amplitude values illustrated in this example have been chosen arbitrarily and may not exactly correspond to the power-frequency spectra 41 and 42. Each of the first spectrum 41 and the second spectrum 42 is obtained from measurement samples recorded during time intervals 43 and 44. Each of the time intervals 43 and 44 has a duration of approximately 25 ms and comprises 1024 measurement samples. In other words, the time intervals used to obtain the first spectrum 41 and the second spectrum 42 are of substantially the same length and are adjacent.

The first spectrum 41 shows an overall noisy appearance but does not reveal any outstanding power peak. The first spectrum 41 fails to capture the acoustic event 32.

On the other hand, the second spectrum 42 shows a high power density peak located in the frequency range below 2 kHz corresponding to the acoustic event 32. Hence it appears important to use a plurality of subsequent time intervals from a continuous period of recording time, allowing to scan the period of recording time, in order to enable the detection of a discrete acoustic event occurring during the period of recording time.

Averaging Effect

In case a Fourier transform analysis is performed over measurement samples taken during a relatively long time interval, e.g. a set of 4096 samples, which corresponds, at an acquisition rate of 44 kHz, to a duration substantially equal to 100 ms, high amplitude samples corresponding to the acoustic event would have a smaller relative weight. As a consequence, the high amplitude acoustic event may not be detected so easily on a power-frequency spectrum calculated over samples corresponding to a relatively long time interval. Performing Fourier transforms on measured samples corresponding to a relatively long time interval may suffer an excessive averaging effect.

Effect of Varying a Duration of the Recording Time Period

Figure 5:
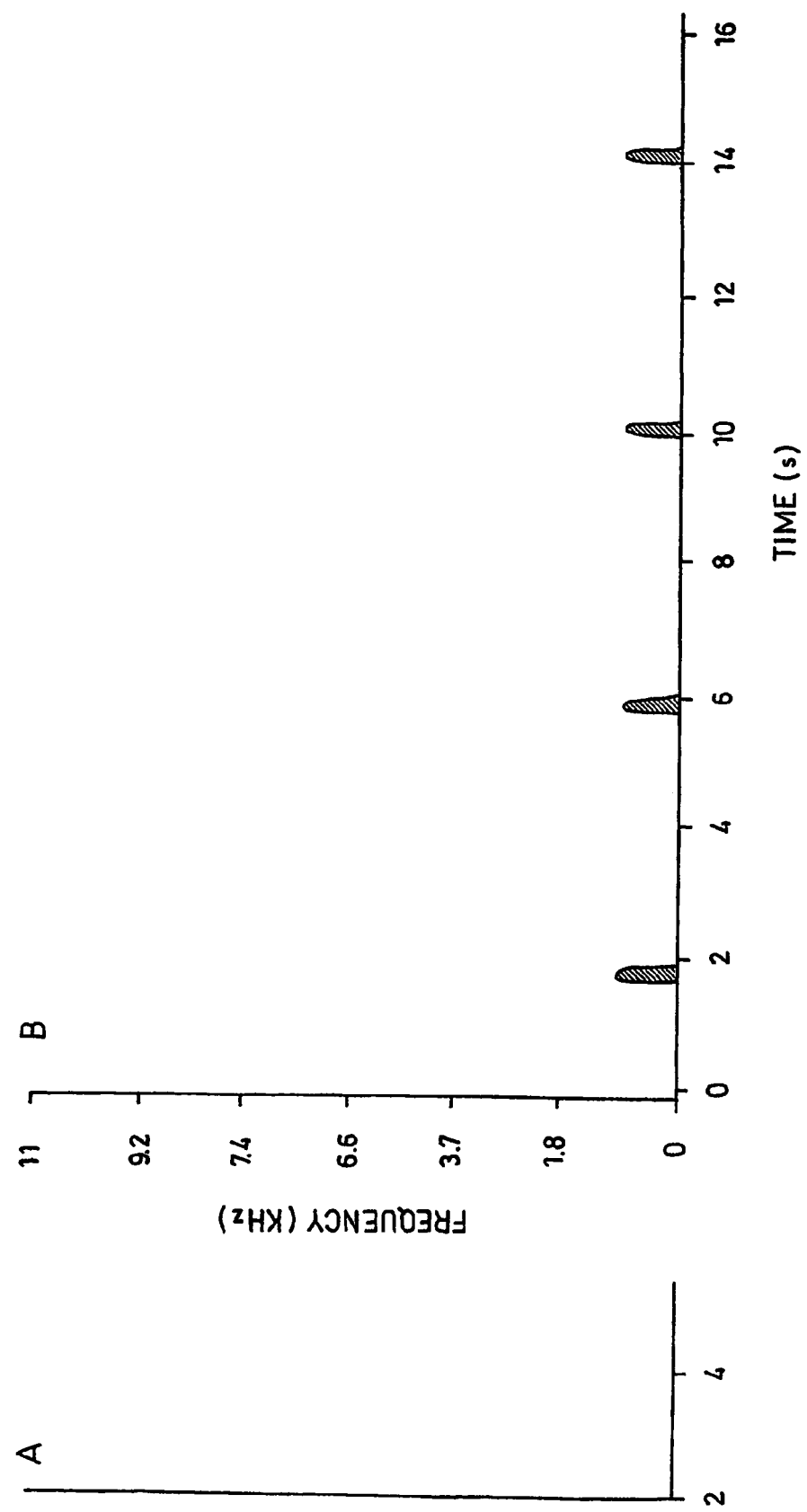
FIG. 5 illustrates a further example of a power-time-frequency plot according to the invention.

FIG. 5 contains a first power-frequency-time plot in part A and a second power-frequency-time plot in part B.

A laboratory recording of gas bubbling into water is performed using a similar experimental set-up as described hereinabove in relation to measurements shown in FIG. 3, except that the bubble rate is lower: approximately one bubble every four seconds.

The first power-frequency-time plot in part A results from a recording time period of approximately 3 s recorded between instants t1=2 s and t2=5 s. There is no power density value exceeding the threshold value and hence no high amplitude acoustic signal visible over this time period.

The second power-frequency-time plot in part B results from a recording time period of approximately 16 s recorded between instants t0=0 s and t3=16 s. A plurality of approximately regularly spaced (in time) hatched surfaces 51 representing power density values that exceed the threshold value appear at approximately 2, 6, 10 and 14 seconds. The hatched surfaces 51 indicate a plurality of discrete acoustic events.

The difference between the first power-frequency-time plot and the second power-frequency time plot illustrates that it is necessary to adapt the duration of the recording time period to the rate of the bubble flowing from the gas outlet in order to have the discrete acoustic event from the bubble inside the recording time period.

Investigation of an Extended Borehole Length

Figure 6:
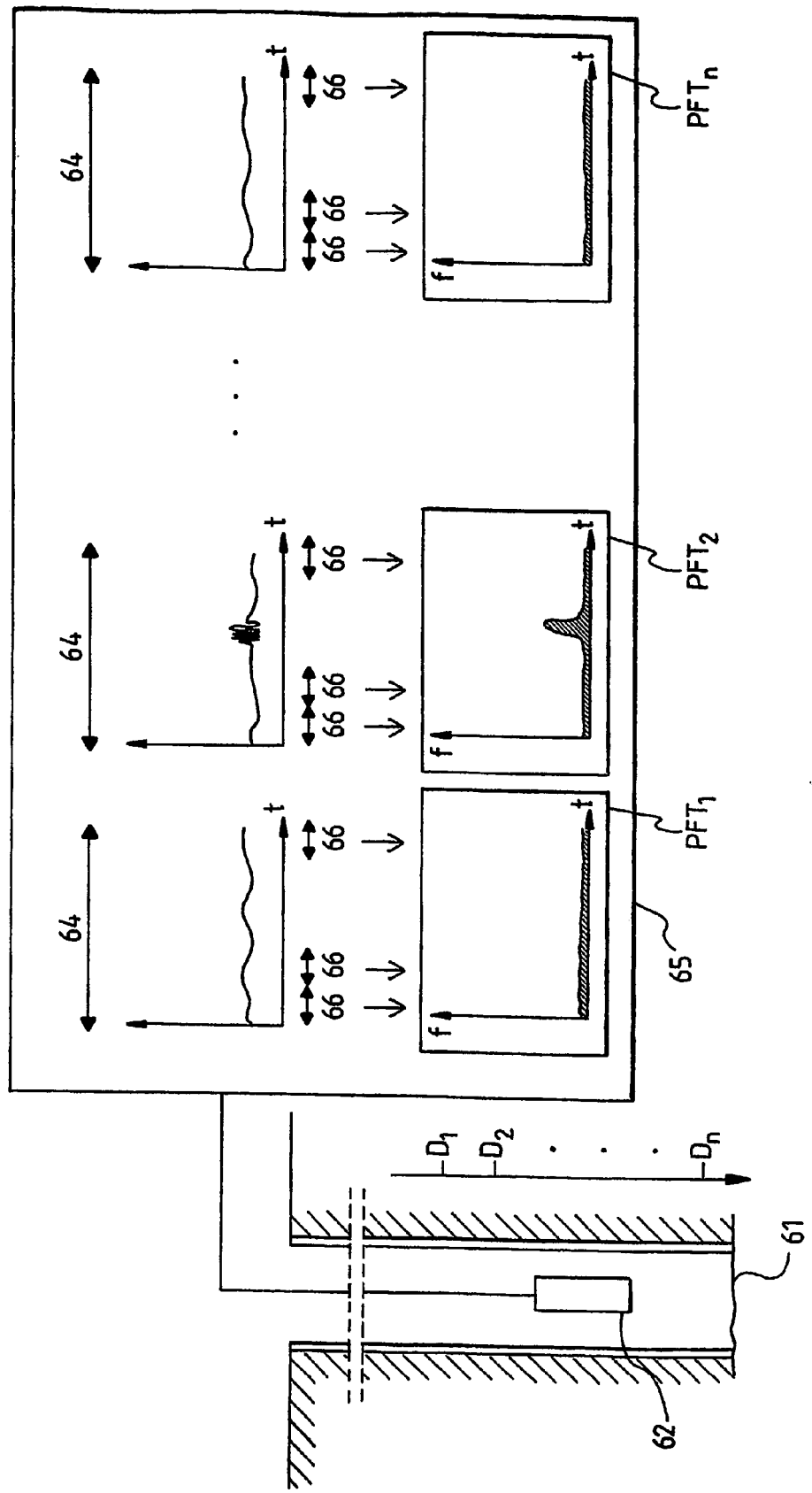
FIG. 6 illustrates a second example embodiment for measuring and processing acoustic amplitudes according to the invention.

FIG. 6 contains an illustration of another example embodiment of the present invention as used to investigate an extended borehole length corresponding to a section lying between depths $D_1$ and $D_n$.

It is understood that the depths are indications of positions in the borehole. A person skilled in the art may well understand that an extended borehole length corresponding to a section lying between determined positions that do not necessarily correspond to depths may be investigated in a similar manner.

At least one passive noise recording is performed at each one of several recording depths $D_1, D_2 \ldots, D_n$ of a borehole 61, using a movable noise detector 62.

A spacing between two adjacent recording depths, e.g. between $D_1$ and $D_2$, may have an influence on the following parameters:

a reduction of the spacing may result in an overall increased time required to investigate a given section since the number of passive recordings is also increased.

an increase of the spacing may in some cases result in failing to detect acoustic generating locations that are too distant from the noise detector 62.

The noise detector 62, e.g. a hydrophone or a geophone, is used to record acoustic amplitude downhole for each depth $D_1, D_2 \ldots, D_n$ respectively for a given period of recording time 64. Information from the measured Acoustic Amplitudes is sent to a surface system 65 for acquisition and analysis. In other examples of embodiments, the recorded information may be processed and analysed in situ near the noise detector 62, or stored for further analysis.

In a similar way as described for measurements made in the system from FIG. 2, time intervals 66 are defined inside of the period of recording time 64. For each time interval 66 the Acoustic Amplitudes are processed to obtain a corresponding power-frequency spectrum (not shown in FIG. 6), using for example Fourier transform analysis.

Hence a plurality of power-frequency spectra is provided for each period of recording time 64, i.e. for each recording depth $D_1, D_2 \ldots, D_n$.

The parameters such as for example the duration of the period of recording time 64, the acquisition rate, and the number of measured samples over which the Fourier transform is performed may be adjusted as discussed in relation to measurements discussed with FIGS. 2-5.

The power-frequency spectra are analysed to detect time and frequency dependant changes of power characteristic of discrete acoustic events. In the illustrated example, the power frequency data for each depth $D_1, D_2 \ldots, D_n$ may respectively be plotted in a power-frequency-time plot $PFT_i$ for the depth $D_i$.

Figure 7:
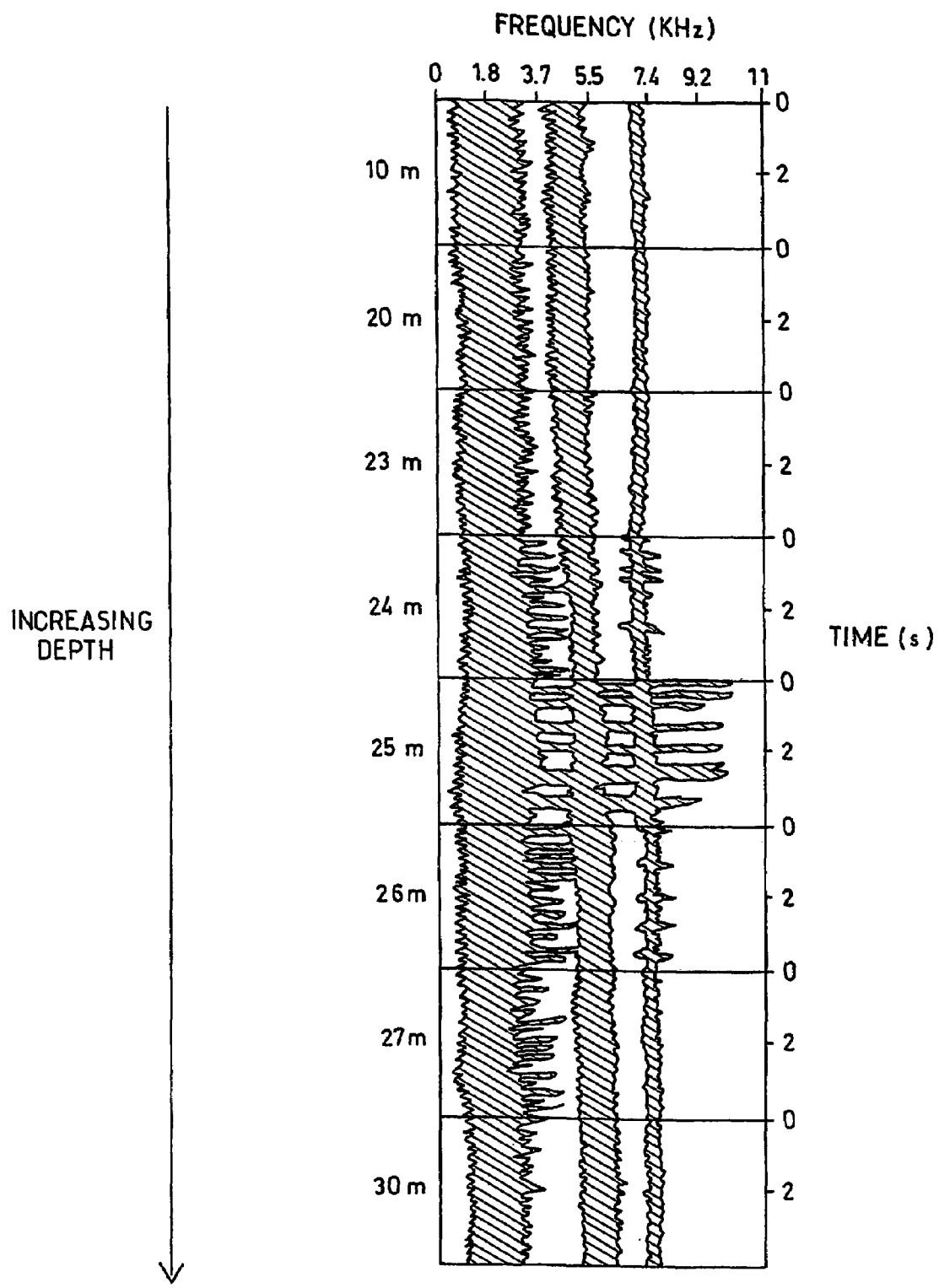
FIG. 7 illustrates an example of power-time-frequency plots presented as a function of depth according to the invention.

The power-frequency-time plots $PFT_1, \ldots, PFT_n$ may be graphically assembled in an extended plot, by juxtaposing the plots one after the other for easier analysis as a function of the depth as shown in FIG. 7.

The example shown in FIG. 7 is the result of acoustic recordings performed at various relative depths, i.e. at 10, 20, 23, 24, 25, 26, 27 and 30 m. These values do not necessarily represent the actual depth as measured from the surface. These values are indicators of distance relative to a determined depth and measured along the section of the borehole. At each depth, Acoustic Amplitude is recorded during a period of recording time of 20 seconds at an acquisition rate of 44 kHz.

For each depth a power-frequency-time plot is generated. A part of each power-frequency-time plot corresponding to a duration of 4 s is presented graphically as a function of depth. In this example, the 4 s part of the plot corresponding to measurements made between instants TB=0 s and TE=4 s of the respective periods of recording time, reveals itself to be adapted to detect an acoustic event occurring in that period during measurement.

Hatched surfaces in the plots correspond to power density values exceeding the threshold. The plots at 10 m, 20 m, 23 m and 30 m reveal 3 frequency ranges centred at values of approximately 1, 8, 4 and 7 kHz, wherein power density values exceed the threshold value, indicating significant background noise at these frequencies. A source of acoustic events at the depth of 25 m may be identified by an increasing hatched surface appearing on the corresponding plot. An attenuation of the acoustic signal away from the source is indicated in the neighbouring plots corresponding to the depths of 24 m, 26 m and 27 m wherein hatched surfaces indicating higher frequency portions of the spectra are reduced or disappear as compared to the 25 m plot.

The overall plot format provides a convenient means to identify the location of acoustic events, even to an inexperienced eye, in that its presentation of the results draws the eye to the relatively "noisy" sections of the logged interval.

It may be noted that the significant background noise in this example is caused by a wire line truck at surface.

In a preferred embodiment the acoustic recordings are performed with the tool stationary at various places in the borehole. This allows to reduce noise that is due purely to the movement of the tool in the borehole.

The inventive method for acoustic detection of a leak may be combined with another commonly used logging method to assess the integrity of the borehole. It may for example be combined with ultrasonic logging. The results obtained using the acoustic detection of a leak and the other method, e.g. the ultrasonic logging method, may be compared and correlated to confirm conclusions on the existence of a leak in the borehole.

The identification of a leak behind a casing may be followed by repair of the leak. In one example of such a repair, a repairing tool is positioned in proximity of the noise source. Every time a leak is identified, the repair tool perforates the casing to obtain an opening and subsequently squeezes in a repair fluid in the opening. The repair fluid may for example be micro-cement, resin or other. In another example embodiment, the repair tool may mill out the casing around the identified leak, and subsequently place a plug of sealing fluid to cover at least the entire volume milled out across from one formation wall to another.

While the invention has been described with respect to a limited number of embodiments, a person skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for acoustic detection of a leak behind a casing (23) of a borehole, the leak generating a discrete acoustic signal, the method comprising
    sampling an acoustic amplitude (AA) during a recording time period (24; 64) at a determined position along the borehole,
    defining time intervals (26; 66) inside of the recording time period (24),
    processing for each time interval (26) the measured acoustic amplitudes to obtain respectively a corresponding power-frequency spectrum (261),
    analyzing a plurality of the power-frequency spectra to identify the discrete acoustic signal by detecting time and frequency dependant changes of power.

2. The method of claim 1, wherein the processing is performed using a Fourier transform analysis.

3. The method according to claim 1, wherein the time intervals are of same duration and subsequent time intervals are adjacent to each other in order to cover a continuous portion of the recording time period.

4. The method according to claim 1, further comprising
    plotting the power-frequency spectra in a power-frequency-time plot graph (27; PFT1, PFT2, . . . , PFTn),
    identifying a surface (28, 29; 31; 51) of the power-frequency-time plot graph wherein a value of power corresponds to a predetermined value,
    analyzing the identified surface to detect the discrete acoustic signal.

5. The method according to claim 1, wherein a duration of the recording time period is adapted to measure at least one discrete acoustic signal.

6. The method according to claim 1, wherein the sampling is performed at one or a plurality of further determined positions along the borehole in order to investigate a section of the borehole covered by the determined and further determined positions.

7. The method according to claim 4, wherein the sampling is performed at one or a plurality of further determined positions along the borehole in order to investigate a section of the borehole covered by the determined and further determined positions, and wherein the power-frequency-time plots resulting from the measured acoustic amplitudes are aligned into an extended graph in an order corresponding to successive positions of the borehole, the extended graph showing frequency and time dependant power values as occurring along the borehole.

8. The method according to claim 1, wherein the sampling is done at an acquisition rate between 30 kHz and 50 kHz.

9. A method for repairing a leak behind a casing of a borehole, comprising:
    Detecting the leak using a method for acoustic detection of a leak behind a casing (23) of a borehole, the leak generating a discrete acoustic signal, the method comprising:
    i. sampling an acoustic amplitude (AA) during a recording time period (24; 64) at a determined position along the borehole,
    ii. defining time intervals (26; 66) inside of the recording time period (24);

iii. processing for each time interval (26) the measured acoustic amplitudes to obtain respectively a corresponding power-frequency spectrum (261);

iv. analyzing a plurality of the power-frequency spectra to identify the discrete acoustic signal by detecting time and frequency dependant changes of power;

Activating a repair process for repairing the leak.

10. A method for detection of a leak behind a casing of a borehole, comprising investigating a portion of the borehole using a first investigation method to obtain a first result of investigation, investigating the portion of the borehole to obtain a second result of investigation using a method for acoustic detection of a leak behind a casing (23) of a borehole, the leak generating a discrete acoustic signal, the method for acoustic detection comprising:

sampling an acoustic amplitude (AA) during a recording time period (24; 64) at a determined position along the borehole, defining time intervals (26; 66) inside of the recording time period (24), processing for each time interval (26) the measured acoustic amplitudes to obtain respectively a corresponding power-frequency spectrum (261), analyzing a plurality of the power-frequency spectra to identify the discrete acoustic signal by detecting time and frequency dependant changes of power;

comparing the first result of investigation with the second result of investigation to identify a correlation between the first result and the second result.

11. The method for repairing a leak according to claim 9, wherein the repair process comprises perforating the casing to obtain an opening and squeezing a repair fluid in the opening.

12. The method for repairing a leak according to claim 9, wherein the repair process comprises milling out the casing around the leak and placing a plug of sealing fluid to cover at least an entire volume milled out from the casing.

* * * * *